US008900540B2

(12) United States Patent
Nishiwaki et al.

(10) Patent No.: US 8,900,540 B2
(45) Date of Patent: Dec. 2, 2014

(54) OXIDATION TREATMENT METHOD AND OXIDATION TREATMENT APPARATUS

(75) Inventors: Yoshiki Nishiwaki, Kai (JP); Hidetoshi Oota, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 13/176,154

(22) Filed: Jul. 5, 2011

(65) Prior Publication Data
US 2012/0003143 A1      Jan. 5, 2012

(30) Foreign Application Priority Data
Jul. 5, 2010   (JP) ................................ P2010-153416

(51) Int. Cl.
| | | |
|---|---|---|
| C01B 13/11 | (2006.01) | |
| D06M 23/10 | (2006.01) | |
| D06M 11/34 | (2006.01) | |
| B22F 1/00 | (2006.01) | |
| D06M 101/40 | (2006.01) | |

(52) U.S. Cl.
CPC ............ C01B 13/11 (2013.01); D06M 2101/40 (2013.01); D06M 23/10 (2013.01); D06M 11/34 (2013.01); B22F 1/0088 (2013.01); C01B 2201/64 (2013.01)
USPC .................................. 423/415.1; 423/594.19

(58) Field of Classification Search
USPC .......................... 423/415.1, 105, 594.19, 219
See application file for complete search history.

(56) References Cited

U.S. PATENT DOCUMENTS

| | | | | |
|---|---|---|---|---|
| 2,975,035 | A | * | 3/1961 | Cook ............................. 423/219 |
| 4,608,402 | A | * | 8/1986 | Redick et al. .................. 523/215 |
| 6,162,304 | A | * | 12/2000 | Weidman et al. ............... 134/12 |

FOREIGN PATENT DOCUMENTS

| | | | | |
|---|---|---|---|---|
| CN | 1082131 | A | 2/1994 | |
| EP | 0465037 | A1 * | 1/1992 | ............. G03G 11/00 |
| JP | 07-258578 | | 10/1995 | |
| JP | 11-349309 | | 12/1999 | |
| JP | 2004-152615 | | 5/2004 | |
| JP | 2004-263205 | | 9/2004 | |
| JP | 2009-079344 | | 4/2009 | |
| JP | 2011026187 | A * | 2/2011 | |

OTHER PUBLICATIONS

Machine translation of JP2009-079344.*
"Ozone Conversions" http://www.ozonesolutions.com/Ozone_Conversions.html Online: Apr. 9, 2009. Accessed Apr. 5, 2012.*
Machine translation of JP 2011026187 A.*
Search Report and English translation in CN 201110191909.6 mailed Jan. 26, 2014.

* cited by examiner

Primary Examiner — Richard M Rump
(74) Attorney, Agent, or Firm — Nixon & Vanderhye P.C.

(57) ABSTRACT

An oxidation treatment method of the present invention includes the step of bringing a solution having an ozone concentration of 120 to 500 mg/L into contact with a substance to be treated made of a combustible substance, thereby subjecting the substance to be treated and the surface thereof to an oxidation treatment. An oxidation treatment apparatus of the present invention includes: a dissolving means that dissolves an oxygen-ozone mixed gas in a fluorine-based solvent to form mixed fluid; an undissolved gas removal means that removes an undissolved gas from the mixed fluid to form a solution; and an oxidation treatment means that brings the solution into contact with a substance to be treated made of a combustible substance, thereby subjecting the substance to be treated and the surface thereof to an oxidation treatment.

1 Claim, 2 Drawing Sheets

OXIDATION TREATMENT METHOD AND OXIDATION TREATMENT APPARATUS

TECHNICAL FIELD

The present invention relates to an oxidation treatment method and an oxidation treatment apparatus.

This application claims priority on Japanese Patent Application No. 2010-153416 filed on Jul. 5, 2010, the disclosure of which is incorporated by reference herein.

BACKGROUND ART

A carbon fiber has excellent properties such as high specific strength and heat resistance and is used as one of a reinforcing material of a composite material. However, since the carbon fiber has poor hydrophilicity when compared with other reinforcing materials, there has been made a study on the improvement of functionality required as a composite material by performing a treatment of a carbon fiber so as to enhance affinity and adhesion between the carbon fiber and an organic material such as a resin or an inorganic material, which serves as a matrix (see, for example, Patent Literature 1).

Also, there has recently been made a study on the prevention of a decrease in a melting temperature and the improvement of dispersibility by treating a metal ultrafine powder, etc. and the surface thereof.

A conventional oxidation treatment method of a carbon fiber and a metal fine powder includes, for example, a wet oxidation method using an aqueous solution of acids, ozonized water and the like, and a dry oxidation method using air, plasma, an ozone gas and the like, and ozone has been well known as a very powerful oxidizing agent since long ago.

There has sufficiently been made a study on the wet oxidation method using ozonized water since long ago. For example, Patent Literature 2, Patent Literature 3 and the like are exemplified.

In contrast, the dry oxidation method requires neither a post-treatment such as neutralization, nor a treatment of a large amount of a waste liquid generated during neutralization and rinsing, and is therefore advantageous from the viewpoint of cost. Thus, the dry oxidation method has recently become of major interest as a method to which, a continuous mass treatment is expected. One of this dry oxidation method includes, for example, a treatment method using an oxidizing gas such as ozone. For example, Patent Literature 4, Patent Literature 5 and the like are exemplified.

CITATION LIST

Patent Literature

[Patent Literature 1]
Japanese Unexamined Patent Application, First Publication No. 2004-152615
[Patent Literature 2]
Japanese Unexamined Patent Application, First Publication No. 2009-79344
[Patent Literature 3]
Japanese Unexamined Patent Application, First Publication No. Hei 11-349309
[Patent Literature 4]
Japanese Unexamined Patent Application, First Publication No. Hei 7-258578
[Patent Literature 5]
Japanese Unexamined Patent Application, First Publication No. 2004-263205

SUMMARY OF INVENTION

Technical Problem

However, problems are involved in each of these methods.

First, in the wet oxidation method using ozonized water, a more simple method is desired since a drying step of drying moisture is required after treatment. In the case of using ozonized water, only a solution having an ozone concentration of about 120 mg/L at most is formed on account of solubility of ozone in water. It is very useful to increase the concentration of ozone in the solution since the treatment time of a substance to be treated decreases.

In contrast, in the dry method, it becomes necessary to use a high concentration oxidizing gas in a treatment of a substance to be treated. However, since an ozone gas is basically formed by subjecting an oxygen gas to discharge, the ozone-containing gas thus formed necessarily contains oxygen. Commonly, the concentration of ozone in the ozone-containing gas is about 14 vol %, the rest being an oxygen gas. Safety limit of the concentration of ozone in the ozone-containing gas is about 14 vol %.

When the substance to be treated has inflammability in an ozone treatment by the dry method, it is preferred that the substance to be treated is not exposed to an atmosphere of an ozone-containing gas having a high oxygen concentration so as to prevent ignition followed by explosion. Therefore, a method of decreasing the concentration of ozone and oxygen by diluting with an inert gas such as nitrogen is usually used. Actually, it was impossible to perform a treatment by high concentration ozone in a vapor phase from an industrial point of view.

There is also known as method in which ozone is formed by subjecting air to discharge so as to decrease the content of oxygen in an ozone-containing gas. In this case, there was a disadvantage that the obtained concentration of ozone is drastically low and also $NO_x$ is formed by nitrogen contained in air.

Under these circumstances, the present invention has been made and an object thereof is to provide an oxidation treatment method and an oxidation treatment apparatus, which can perform an oxidation treatment of a substance to be treated made of a combustible substance such as a carbon fiber or a metal fine powder, in oxygen, safely and simply.

Solution to Problem

In order to achieve such an object, according to a first aspect of the present invention, there is provided a surface oxidation treatment method including the step of bringing an ozone-fluorine based solvent mixed solution having an ozone concentration of 120 to 500 mg/L into contact with a substance to be treated made of a combustible substance, thereby subjecting a surface of the substance to be treated to an oxidation treatment.

In the first aspect of the present invention, the ozone-fluorine based solvent mixed solution is preferably brought into contact with the substance to be treated in a state of liquid, droplet and gas.

In the first aspect of the present invention, the ozone-fluorine based solvent mixed solution is preferably formed by dissolving an oxygen-ozone mixed gas in a fluorine-based solvent to form a mixed solution, and then removing the undissolved gas from the mixed solution.

In the first aspect of the present invention, it is preferred to further include the steps of:

supplying an inert gas to the ozone-fluorine based solvent mixed solution and then deaerating the ozone-fluorine based solvent mixed solution to form an ozone-containing inert gas; and bringing the ozone-containing inert gas into contact with the substance to be treated in a vapor phase.

Namely, the first aspect of the present invention may be directed to a surface oxidation treatment method including the steps of:

supplying an inert gas to an ozone-fluorine based solvent mixed solution having an ozone concentration of 120 to 500 mg/L and then deaerating the ozone-fluorine based solvent mixed solution to form an ozone-containing inert gas; and bringing the ozone-containing inert gas into contact with a substance to be treated in a vapor phase, thereby subjecting a surface of the substance to be treated to an oxidation treatment, wherein the ozone-fluorine based solvent mixed solution is formed by dissolving an oxygen-ozone mixed gas in a fluorine-based solvent to form a mixed solution, and then removing the undissolved gas from the mixed solution.

According to a second aspect of the present invention, there is provided a surface oxidation treatment apparatus including:

a dissolving means (dissolving device) that dissolves an oxygen-ozone mixed gas in a fluorine-based solvent to form a mixed solution;

an undissolved gas removal means (oxygen separation device) that removes an undissolved gas from the mixed solution to form an ozone-fluorine based solvent mixed solution; and a surface oxidation treatment means (liquid phase reaction device) that brings the ozone-fluorine based solvent mixed solution into contact with a substance to be treated made of a combustible substance, thereby subjecting a surface of the substance to be treated to an oxidation treatment.

In the second aspect of the present invention, it is preferred to further include, between the undissolved gas removal means and the surface oxidation treatment means, a temperature control means that heats the ozone-fluorine based solvent mixed solution.

Namely, the second aspect of the present invention may be directed to a surface oxidation treatment apparatus including:

a dissolving means (dissolving device) that dissolves an oxygen-ozone mixed gas in a fluorine-based solvent to form a mixed solution;

an undissolved gas removal means (oxygen separation device) that removes an undissolved gas from the mixed solution to form an ozone-fluorine based solvent mixed solution;

a temperature control means (heating device) that heats the ozone-fluorine based solvent mixed solution to form a vapor-liquid mixed state; and a surface oxidation treatment means (vapor-liquid reaction device) that brings the ozone-fluorine based solvent mixed solution into contact with a substance to be treated made of a combustible substance in a vapor-liquid mixed state, thereby subjecting a surface of the substance to be treated to an oxidation treatment.

In the second aspect of the present invention, it is preferred to further includes, between the undissolved gas removal means and the surface oxidation treatment means, a deaeration means that supplies an inert gas into the ozone-fluorine based solvent mixed solution to form an ozone-containing inert gas.

Namely, the second aspect of the present invention may be directed to a surface oxidation treatment apparatus including:

a dissolving means (dissolving device) that dissolves an oxygen-ozone mixed gas in a fluorine-based solvent to form a mixed solution;

an undissolved gas removal means (oxygen separation device) that removes an undissolved gas from the mixed solution to form an ozone-fluorine based solvent mixed solution;

a deaeration means (deaeration device) that deaerates the ozone-fluorine based solvent mixed solution supplied with an inert gas to form an ozone-containing inert gas; and a surface oxidation treatment means (vapor phase reaction device) that brings the ozone-containing inert gas into contact with a substance to be treated made of a combustible substance, thereby subjecting a surface of the substance to be treated to an oxidation treatment.

In the second aspect of the present invention, it is preferred to further include, between the surface oxidation treatment means and the dissolving means, a circulating path through which the fluorine-based solvent is recovered and circulated.

In the second aspect of the present invention, it is preferred to further includes:

a means (ozone monitor) that monitors an ozone concentration of the circulating ozone-fluorine based solvent mixed solution;

a means (valve) that adjusts an ozone concentration and a supply amount of the oxygen-ozone mixed gas to be supplied to the dissolving means, according to the ozone concentration of the circulating ozone-fluorine based solvent mixed solution; and a mechanism that is capable of controlling the ozone concentration of the ozone-fluorine based solvent mixed solution to be used in the oxidation treatment of the surface of the substance to be treated.

In the second aspect of the present invention, an ozone concentration of the ozone-fluorine based solvent mixed solution formed by the undissolved gas removal means is preferably within a range from 120 to 500 mg/L.

Advantageous Effects of Invention

The oxidation treatment method of the present invention includes the step of bringing a solution having an ozone concentration of 120 to 500 mg/L into contact with a substance to be treated, thereby subjecting the substance to be treated and the surface thereof to an oxidation treatment, and the ozone concentration is high when compared with the prior art, and thus the reaction rate is also high and it is possible to perform an oxidation treatment of a carbon fiber, a metal fine powder and the like using ozone, which was difficult in the prior art. Since the oxidation treatment using ozone is performed under a fluorine-based solvent or inert gas atmosphere, reactions such as ignition and combustion can be suppressed. Therefore, it is possible to perform an oxidation treatment of a substance to be treated made of a combustible substance such as a carbon fiber or a metal fine powder in oxygen, safely and simply.

The oxidation treatment apparatus of the present invention include a dissolving means that dissolves an oxygen-ozone mixed gas in a fluorine-based solvent to form mixed fluid, an undissolved gas removal means that removes an undissolved gas from the mixed fluid to form a solution, and an oxidation treatment means that brings the solution into contact with a substance to be treated made of a combustible substance, thereby subjecting the substance to be treated and the surface thereof to an oxidation treatment. Therefore, it is possible to form a solution having an ozone concentration of 120 to 500 mg/L, and also to bring this solution into contact with a substance to be treated, thereby subjecting the substance to be treated and the surface thereof to an oxidation treatment.

DESCRIPTION OF EMBODIMENTS

Figure 1:
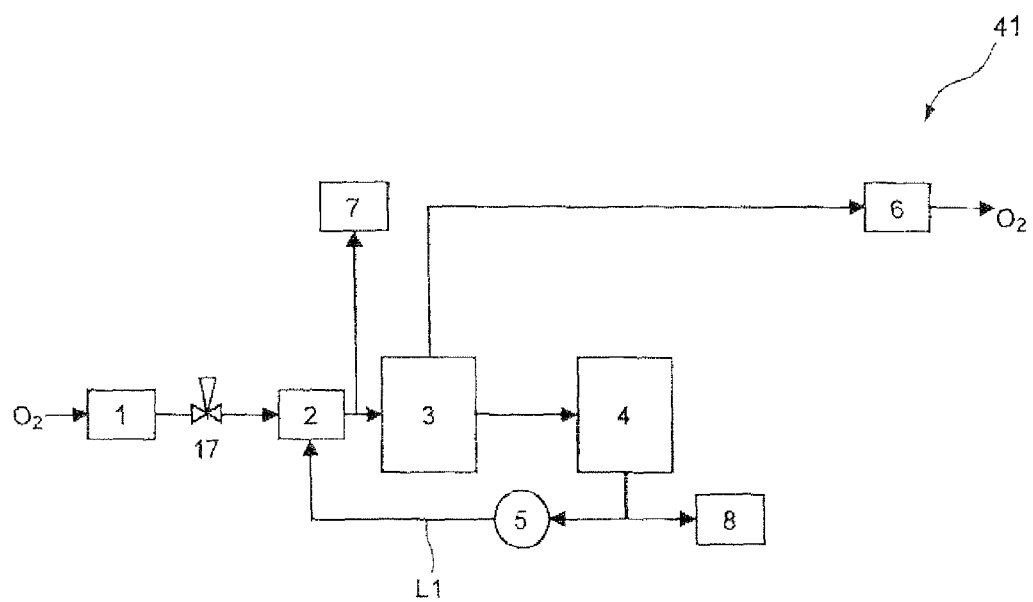
FIG. 1 is a schematic block diagram showing an oxidation treatment apparatus which is the first embodiment of the present invention.

The oxidation treatment method as an embodiment to which the present invention is applied will be described in detail, together with the oxidation treatment apparatus with reference to the accompanying drawings. In the drawings used in the following description, characterizing portions are shown in an enlarged scale for convenience, and dimensional proportions of the respective structural elements are not necessarily real for the purpose of making it easy to understand features.

<First Embodiment>

First, the oxidation treatment apparatus used in the first embodiment of the present invention will be described. As shown in FIG. 1, an oxidation treatment apparatus 41 of the present embodiment is schematically constituted by including a ozonizer 1 which is an ozone generating device, a dissolving device (a dissolving means) 2 which is a dissolution device, an oxygen separation device (an undissolved gas removal means) 3 which removes a gas component to form a solution, and a liquid phase reaction device (an oxidation treatment means or a surface oxidation treatment means) 4 which allows a substance to be treated to react with ozone.

The ozonizer 1 is a device which generates ozone using an oxygen as a raw material. Examples of the ozonizer 1 include a silent discharge type ozonizer. By this ozonizer 1, a mixed gas of oxygen and ozone (an oxygen-ozone mixed gas) is formed. There is no particular limitation on the concentration of ozone in the oxygen-ozone mixed gas and, for example, it is preferred to form an oxygen-ozone mixed gas having an ozone concentration within a range from 6 to 10 vol %. The ozonizer 1 may be provided with a flow rate adjustment device which automatically controls a flow rate of the oxygen-ozone mixed gas to be supplied.

The dissolving device 2 is a device which mixes the oxygen-ozone mixed gas with the fluorine-based solvent generated in the ozonizer 1, thereby dissolving the oxygen-ozone mixed gas in the fluorine-based solvent to form a solution. Examples of the dissolving device 2 include a static mixer, an aspirator and the like. In the dissolving device 2, in order to increase the amount of the oxygen-ozone mixed gas dissolved in the solution, a dissolution treatment is preferably performed under a pressure of 0.05 to 1.0 MPaG, and desirably 0.1 to 0.3 MPaG.

The fluorine-based solvent selectively dissolves ozone from the mixed gas of oxygen and ozone, and examples thereof include fluorocarbons, fluoroketones, fluoroethers, a mixture thereof and the like. The fluorine-based solvent used in the present embodiment exhibits a liquid state at normal temperature and the boiling point is preferably from 40 to 100° C.

Examples of the aforementioned fluorocarbons include hydrofluorocarbons such as pentafluoropropane ($CHF_2CH_2CF_3$); and perfluorocarbon such as perfluoropentane ($C_5F_{12}$) and perfluorohexane ($C_6F_{14}$). Examples of the aforementioned fluoroketones include perfluoroketones such as 1,1,1,2,2,4,5,5,5-nonafluoro-4-(trifluoromethyl)-3-pentanone ($C_6F_{12}O$). Examples of fluoroethers include $C_4F_9OC_2H_5$ and the like. Among aforementioned fluorine-based solvents, perfluorocarbon ($C_5F_{12}$, $C_6F_{14}$, etc.) is more preferred since it has a combustion prevention effect. Specifically, for example, the dissolution amount of oxygen and the dissolution amount of ozone per 1 L of a liquid of perfluorohexane ($C_6F_{14}$) at normal temperature are respectively about 0.6 L and about 2 L, and ozone is selectively dissolved.

The concentration of ozone in the solution is desirably the concentration or more, which could not have hitherto been realized by ozonized water. However, when the concentration becomes too high, since a decomposition reaction of ozone per se is accelerated, the concentration is preferably within a range from 120 to 500 mg/L. When the concentration is 120 mg/L or less, there arises a problem that the reaction time is prolonged since the ozone concentration is low. In contrast, when the concentration is 500 mg/L or more, there arises a problem that a decomposition reaction of ozone per se arises.

The oxygen separation device 3 is a removal device for removing a surplus gas component which is not dissolved in the aforementioned solution, and is provided at the downstream of the dissolving device 2. The oxygen separation device 3 is provided with a line for supplying a mixed fluid formed in the dissolving device 2 to the oxygen separation device 3, a line for sending a solution from which the undissolved gas was removed to the subsequent device, and an exhaust line for discharging a gas component separated and removed from the mixed fluid out of the system. The exhaust line is provided with an ozone decomposition device 6.

A solution and an undissolved gas component axe introduced into the oxygen separation device 3, and the introduced gas component can be removed. Herein, with respect to the dissolution amount of the fluorine-based solvent in the solution, as mentioned above, since the amount of ozone is larger than that of oxygen, surplus oxygen, which was not dissolved in the fluorine-based solvent, is mainly separated herein. A part of ozone is also separated while accompanying with oxygen. The separated and removed gas component is discharged out of an oxygen separation tank through an exhaust line and discharged out of the system through the ozone decomposition device 6.

Furthermore, the oxygen separation device 3 may be equipped with a gas dissolution device such as a baffle plate so as to accelerate dissolution of ozone in the fluorine-based solvent.

The oxygen separation device 3 is provided with a pressure control device (a pressure control means, not shown). The pressure control device is not particularly limited as long as it can be maintained or control at a desired pressure when the oxygen-ozone mixed gas is dissolved in the fluorine-based solvent to form a mixed fluid. In the present embodiment, the pressure control device includes, for example, a pressure control valve.

More specifically, the oxygen separation device 3 is provided with, as the pressure control device, a pressure control valve. This pressure control valve can maintain the pressure inside the dissolving device 2 increased by the oxygen-ozone mixed gas supplied from the ozonizer 1 and the circulating solvent (fluorine-based solvent) at a predetermined pressure. Namely, it is possible to maintain the pressure inside the dissolving device 2 by a pressure control valve at an optimum pressure when the oxygen-ozone mixed gas is dissolved in the fluorine-based solvent to form a mixed fluid. Herein, in order to facilitate dissolution of the oxygen-ozone mixed gas in the fluorine-based solvent, it is preferred to maintain the pressure (namely, a pressure inside the dissolving device 2) at a high pressure when the oxygen-ozone mixed gas is dissolved in the fluorine-based solvent to form a mixed fluid.

The liquid phase reaction device 4 which enables the solution formed in the oxygen separation device 3 to react with the substance to be treated. The liquid phase reaction device 4 has a structure in which the substance to be treated can be charged therein, and also may be equipped with a mechanism capable of adjusting a pressure or a temperature. There is no particular limitation on the material. From the viewpoint of visibility, glass or the like is preferred at a normal pressure, and a material having high ozone resistance such as SUS is used under a pressure. The liquid phase reaction device may be provided with a mechanism which can continuously introduce and discharge the substance to be treated.

Examples of the substance to be treated include a carbon fiber, a metal fine powder and the like, having inflammability, which has hitherto been difficult to be subjected to an oxidation treatment using ozone. Examples of the carbon fiber include a PAN-based fiber, a pitch-based fiber and a cellulose-based fiber, and examples of the metal fine powder include Ni, Cu, Ti, Co and the like.

A pump 5 enables the solution having the ozone concentration decreased after completion of the reaction to return again to the dissolving device 2 from the liquid phase reaction device 4. This pump 5 is provided on a circulating path L1. Whereby, the fluorine-based solvent can be recovered and recycled without being discarded.

The ozone decomposition device 6 decomposes ozone mixed when the undissolved component is removed in the oxygen separation tank 3, and an ozone decomposition catalyst is filled in the vessel. There is no particular limitation on the ozone decomposition catalyst, and the ozone decomposition catalyst may be any one as long as it decomposes ozone. Examples thereof include an activated carbon, a silica-alumina catalyst and the like.

Ozone monitors (means that monitor an ozone concentration) 7, 8 monitor an ozone concentration of a supply side and an exhaust side of a reaction device, and judges completion of the reaction. These zone monitors 7, 8 may share the supply side and the exhaust side. In that case, it is necessary to be provided with a mechanism capable of switching a line of the supply side and a line of the exhaust side by a three-way valve or the like.

It is preferred to monitor the ozone concentration of the exhaust side in an ozone monitor 8 and to adjust a supply amount of an oxygen-ozone mixed gas to be supplied from the ozonizer 1 according to the concentration. Whereby, the ozone concentration in the solution can be controlled and a treatment at an optimum ozone concentration can be carried out. Specifically, a valve 17 (a means that adjusts an ozone concentration and a supply amount) is preferably provided between the ozonizer 1 and the dissolving device 2 in the oxidation treatment apparatus 41. When the ozone concentration monitored in the ozone monitor 8 decreases, a valve 17 is controlled to increase the supply amount of the oxygen-ozone mixed gas. In contrast, when the ozone concentration increases, it is possible to adjust the amount of ozone dissolved in the fluorine-based solvent in the dissolving device 2 and to constantly maintain the concentration of ozone in the solution by decreasing the supply amount of the oxygen-ozone mixed gas. It is also possible to freely vary the ozone concentration of the solution according to the degree of difficulty of the reaction of the substance to be treated. A mechanism capable of automatically controlling by feedback of the ozone concentration of the ozone monitor 8 may be provided.

The oxidation treatment method of the present embodiment using the aforementioned oxidation treatment apparatus 41 will be described below.

According to the oxidation treatment method of the present embodiment, an oxidation treatment of the substance to be treated and the surface thereof is performed by bringing a solution having an ozone concentration of 120 to 500 mg/L into contact with a substance to be treated made of a combustible substance. Specifically, the oxidation treatment method is constituted by including the step of dissolving an oxygen-ozone mixed gas in a fluorine-based solvent to form a mixed fluid and the step of removing a surplus gas from the mixed fluid thus formed.

In the oxidation treatment method of the present embodiment, first, the oxygen-ozone mixed gas formed by an ozonizer 1 is supplied to a dissolving device 2. Next, in the dissolving device 2, the oxygen-ozone mixed gas is dissolved in a fluorine-based solvent to form a solution. In order to increase the amount of the oxygen-ozone mixed gas to be dissolved in the fluorine-based solvent, a dissolution treatment using the dissolving device 2 is desirably performed under a pressure.

Next, the mixed fluid is supplied to an oxygen separation device 3. In the oxygen separation device 3, a surplus gas component is removed from the supplied solution and the undissolved surplus gas component. The removed gas component is discharged out of the system from an ozone decomposition device 7 through an exhaust line.

Next, the solution after removing the surplus gas component is supplied from the oxygen separation device 3 to a liquid phase reaction device 4 in which a substance to be treated has already been charged therein and then an oxidation treatment is performed. At this time, it may be supplied by spraying using a spray nozzle or the like. The oxidation treatment time can be set until the values of ozone monitors 7, 8 become identical.

As mentioned above, according to the oxidation treatment apparatus 41 of the present embodiment and the oxidation treatment method using the same, a dissolving device 2 which dissolves an oxygen-ozone mixed gas in a fluorine-based solvent to form a mixed fluid is used. The fluorine-based solvent can form the solution in which ozone is dissolved in a larger amount than that in the case of using water as the solvent. The undissolved oxygen and ozone are removed from the mixed fluid by the oxygen separation device 3, and also the solution is supplied to a liquid phase reaction device 4 and then reacted with a substance to be treated. Herein, a lot of fluorine-based solvents are inert and incombustible and therefore slightly react with ozone and a substance to be treated.

According to the present embodiment, since the oxygen separation device 3 is equipped with a pressure control valve as a pressure control device and can maintain inside the oxygen separation device 3 at a high pressure, a large amount of ozone can be dissolved in the fluorine-based solvent.

Furthermore, the ozone concentration of the solution to be formed can be easily adjusted by the amount of the oxygen-ozone mixed gas to be supplied to the dissolving device 2.

In the present embodiment, since an oxidation treatment using ozone is performed in an inert and incombustible fluorine-based solvent, a risk of ignition and combustion can be reduced despite the fact that the substance to be treated has inflammability.

Use of a fluorine-based solvent having a low boiling enables a drying step after treatment to be performed within a short time when compared with an oxidation treatment using water, and to facilitate the drying step.

<Second Embodiment>

Next, a second embodiment to which the present invention is applied will be described.

The present embodiment has a constituent which is different from that of the first embodiment. Therefore, in the present embodiment, the same numerals are used for structural elements identical to that of the first embodiment, and repetitive descriptions are omitted.

Figure 2:
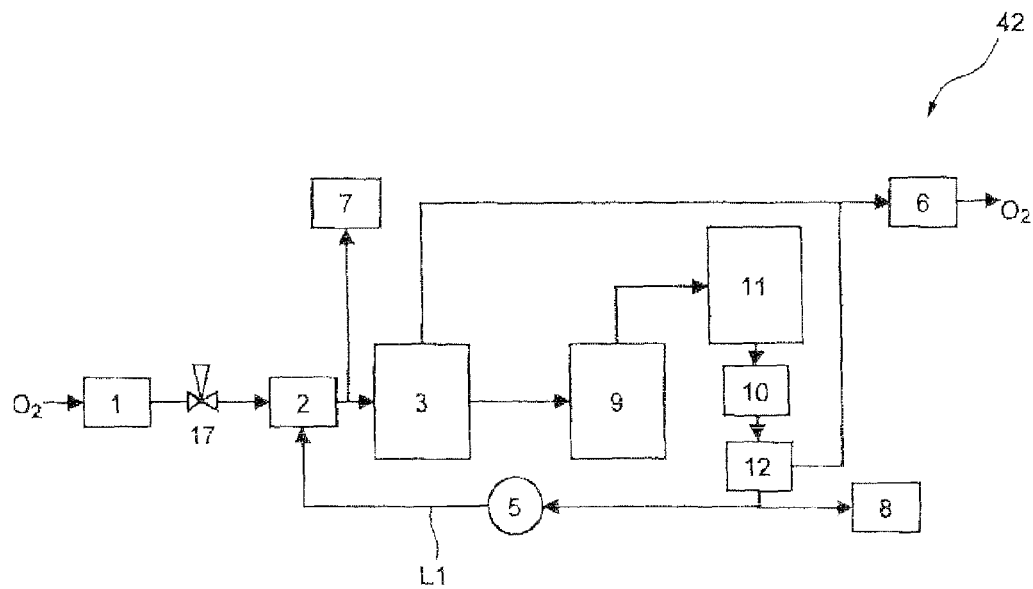
FIG. 2 is a schematic block diagram showing an oxidation treatment apparatus which is the second embodiment of the present invention.

As shown in FIG. 2, the oxidation treatment apparatus 42 of the present embodiment is constituted by including a heating device (a temperature control means) 9, a cooling device 10, and a vapor-liquid reaction device (an oxidation treatment means or a surface oxidation treatment means) 11, whereas, the oxidation treatment apparatus 41 of the first embodiment includes a liquid phase reaction device 4.

The heating device 9 and the cooling device 10 are particularly limited as long as they are capable of heating or cooling a solution flowing therein and maintaining and controlling the solution at a desired temperature.

Specifically, in the present embodiment, similarly to the method of the first embodiment, a solution is formed in an oxygen separation device 3 and then supplied to the heating device 9. The solution supplied to the heating device 9 is heated into a vapor-liquid mixed state, supplied to a vapor-liquid reaction device 11 in which a substance to be treated has been charged, and then subjected to an oxidation treatment. The oxidation treatment time can be set until the values of ozone monitors 7, 8 become identical.

The liquid phase reaction device 11 enables the solution in a vapor-liquid mixed state formed in the heating device 9 to react with the substance to be treated. The liquid phase reaction device 11 has a structure in which the substance to be treated can be charged therein, and also can be equipped with a mechanism capable of adjusting a pressure or a temperature. There is no particular limitation on the material. From the viewpoint of visibility, glass or the like is preferred at a normal pressure, and a material having high ozone resistance such as SUS is used under a pressure. The liquid phase reaction device may be provided with a mechanism which can continuously introduce and discharge the substance to be treated.

The vapor-liquid reaction device 11 may not be substituted with an inert gas after charging the substance to be treated. However, since the content of oxygen in atmospheric air may be involved in an oxidation treatment, it is desired to be substituted wit an inert gas. There is no particular limitation on the pressure of substitution with an inert gas as long as the pressure is an atmospheric pressure or more. However, when the pressure is higher than the pressure of the solution converted into a vapor-liquid mixed state to be supplied, back flow of the solution may arise, and thus it is necessary that the pressure is lower than that of the solution to be supplied.

There is no particular limitation on the kind of an inert gas and, specifically, examples thereof include an argon (Ar) gas, a helium (He) gas, a nitrogen gas ($N_2$) and the like. Among these inert gases, a nitrogen gas is preferred from the point view of cost.

Next, the solution reacted with the substance to be treated in the vapor-liquid reaction device 11 pass through a vapor-liquid separation device 12 and then separated into ozone as a gas component and a fluorine-based solvent as a liquid component.

When the heating temperature in the heating device 9 is too low, the fluorine-based solvent per se is not vaporized. In contrast, when the heating temperature is too high, upsizing of the heating device 9 and the cooling device 10 arises. Therefore, it is preferred to control at about a boiling point of the fluorine-based solvent to be used. The heating device 9 of the present embodiment may be in the form of being directly attached to an oxygen separation device 3.

The cooling device 10 is provided on a line in which fluorine-based solvent supplied from a vapor-liquid reaction device 11 is circulated from a vapor-liquid separation device 12 to a dissolving device 2. By this cooling device 10, the fluorine-based solvent as the liquid component separated by the vapor-liquid separation device 12 can be returned to the dissolving device 2 through a circulating path L1 after cooling.

Commonly, since the amount of a gas dissolved in a liquid increases as the temperature of the liquid becomes lower, the temperature in case of formation of a mixed fluid in the dissolving device 2 is preferably lowered. Specifically, the temperature is preferably from 0 to 20° C. In this way, use of the cooling device 10 makes it possible to control to the temperature at which satisfactory efficiency is attained when ozone is dissolved in a fluorine-based solvent to form a solution. The cooling device 9 of the present embodiment may be in the form of being directly attached to the dissolving device 2.

Since the temperature of the substance to be treated in the vapor-liquid reaction device 11 is a normal temperature, when the solution having a temperature of about boiling point of fluorine-based solvent in a vapor-liquid mixed state is supplied, a part of the fluorine-based solvent component in the solution is liquefied and may be sometimes adhere to the substance to be treated as a droplet. However, there arises no problem since the fluorine-based solvent has a function of suppressing combustion and ignition of combustibles. Rather, it is possible to remarkably reduce a risk of ignition of an inflammable substance to be treated. Since the amount of droplet which adheres to the substance to be treated is not so large when compared with the first embodiment, the subsequent drying step is art the problem-free level when compared with the first embodiment.

In order to further omit the drying step, in a state where a vapor-liquid reaction device 11 is heated to a boiling point or higher of a fluorine-based solvent used in advance, the gas, which was obtained by heating the solution to the boiling point or higher of the fluorine-based solvent so as to completely evaporate the solution, is supplied to the vapor-liquid reaction device 11 and may be reacted. In this case, since the substance to be treated is only exposed to the gas, drying step after treatment becomes unnecessary.

A treatment of the solution formed by the oxidation treatment method of the first embodiment is performed in a liquid state, whereas, a treatment is performed in a state of vapor-liquid mixing obtained by heating a solution in the oxidation treatment method of the present embodiment.

As described above, according to the oxidation treatment method of the present embodiment, the same effects as those of the first embodiment can be obtained. Furthermore, in the present embodiment, since the fluorine-based solvent to be adhered to a substance to be treated is droplet when compared with the first embodiment, a drying step after treatment can be further shorten. Since the drying step after treatment is not required, the similar effects can be obtained even if a solution is used in the reaction after converting into a gas. In the present embodiment, since the content of a liquid component of the solution is less than that of first embodiment, reduction in a risk of ignition and combustion is poor.

<Third Embodiment>

Next, the third embodiment to which the present invention is applied will be described.

The oxidation treatment apparatus of the present embodiment has a constitution which is different from those of oxidation treatment apparatuses 41, 42 of the first and second embodiments. Therefore, in the oxidation treatment apparatus of the present embodiment, the same numerals are used for structural elements identical to those of the first and second embodiments, and repetitive descriptions are omitted.

Figure 3:
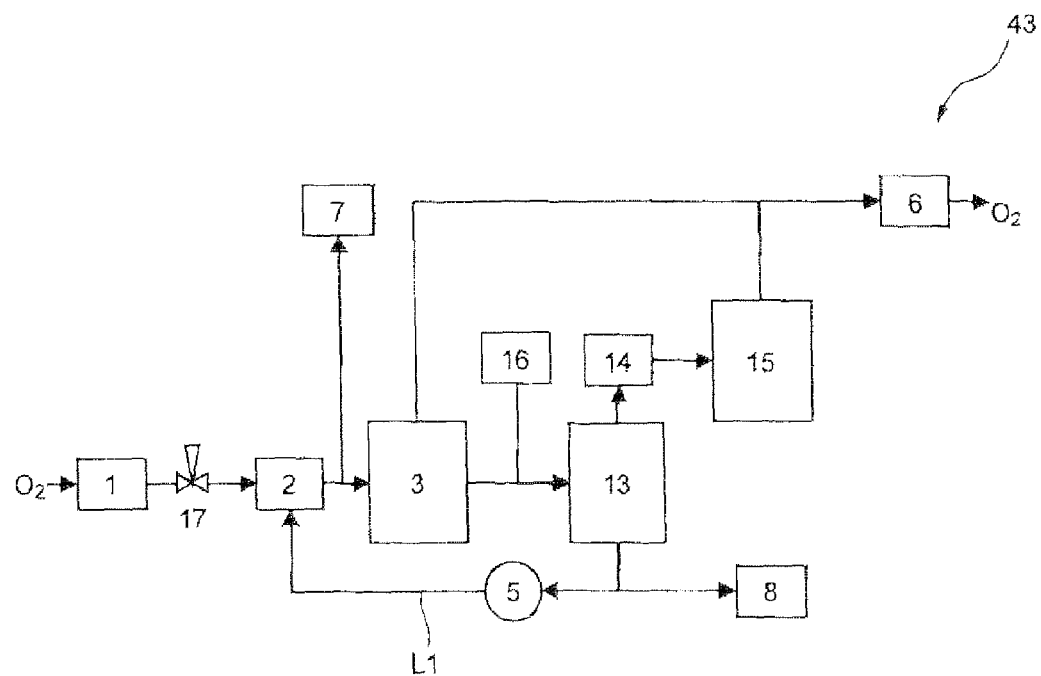
FIG. 3 is a schematic block diagram showing an oxidation treatment apparatus which is the third embodiment of the present invention.

As shown in FIG. 3, the oxidation treatment apparatus 43 of the present embodiment is constituted by including a deaeration device (a deaeration means) 13, a solvent recovery device 14, a vapor phase reaction device (an oxidation treatment means or a surface oxidation treatment means) 15 and an inert gas supply device 16, whereas, the treatment device 41 of the first embodiment includes a liquid phase reaction device 4 and the oxidation treatment apparatus 42 of the second embodiment includes a heating device 9, a cooling device 10 and a vapor-liquid reaction device 11.

The deaeration device 13 is device which deaerates ozone from a solution and is provided at the downstream side of the oxygen separation device 3. The deaeration device 13 is also provided with a pressure control valve as the pressure control device, similarly to the oxygen separation device 3. Namely, when the pressure inside the deaeration device 3 is taken out by the pressure control valve and the ozone-containing gas is taken out from the solution, the ozone-containing gas can be separated while maintaining at an optimum pressure.

A pressurization device (a pressurization means) which positively controls the pressure or an evacuation device (an evacuation means) may be used as the pressure control device.

Herein, in order to facilitate dissolution of an oxygen-ozone mixed gas in a fluorine-based solvent, it is preferred to maintain the pressure in the case of dissolving an oxygen-ozone mixed gas in a fluorine-based solvent to form a mixed fluid (namely, a pressure inside the dissolving device 2) at a high pressure. In contrast, the pressure in the case of taking out an ozone-containing gas from a solution (namely, a pressure inside the deaeration device 13) may be set at a pressure lower than that in the case of dissolving the aforementioned oxygen-ozone mixed gas in the fluorine-based solvent.

The pressure inside the deaeration device 13 is preferably adjusted to a pressure which is slightly larger than atmospheric pressure and, specifically, the pressure is preferably maintained or controlled at a pressure which is 0.05 MPaG higher than an atmospheric pressure.

The pressure when the oxygen-ozone mixed gas in the dissolving device 2 is dissolved in the fluorine-based solvent is preferably maintained (or controlled) at a pressure which is 0.05 MPaG higher than the pressure inside the deaeration device 13, and more preferably maintained (or controlled) at a pressure which is 0.3 MPaG higher than the pressure inside the deaeration device.

In order to supply an inert gas to the aforementioned solution after removing an undissolved gas, an inert gas supply device 16 is provided oxygen between the separation device 3 and the deaeration device 13. Between the oxygen separation device 3 and the deaeration device 13, a line for supplying an inert gas from the inert gas supply device 16 is provided. The inert gas can be added to the solution led out from oxygen separation device 3 by this line. In this way, formation of a high concentration ozone-containing gas in the deaeration device 13 can be prevented by diluting the solution with an inert gas.

There is no particular limitation on the kind of an inert gas and, specifically, example there of include an argon (Ar) gas, a helium (He) gas, a nitrogen gas ($N_2$) and the like. Among these inert gases, a nitrogen gas is preferred from the viewpoint of cost.

It is possible to use, as the fluorine-based solvent in the present embodiment, the same fluorine-based solvent as in the first and second embodiments. However, when a boiling point of the fluorine-based solvent is low during the deaeration using the inert gas, the fluorine-based solvent may be discharged out of the system together with the inert gas, and thus a fluorine-based solvent having a boiling point as high as possible is desired. Specifically, the boiling point is preferably from 100 to 200° C.

The solvent recovery device 14 is provided at the downstream side of the deaeration device 13 so as to remove a fluorine-based solvent component from an ozone-containing gas after deaeration. To the solvent recovery device 14, a line for supplying the ozone-containing gas containing the fluorine-based solvent after deaeration from the deaeration device 13, and a line for supplying the ozone-containing gas after removing the fluorine-based solvent to a vapor phase reaction device 15 are connected. By providing this solvent recovery device 14, the fluorine-based solvent component can be removed and recovered from the ozone-containing gas and recycled.

The vapor phase reaction device 15 enables the ozone-containing gas formed by the deaeration device 13 and the inert gas supply device 16 to react with a substance to be treated. The vapor phase reaction device 15 has a structure in which the substance to be treated can be charged therein, and also can be equipped with a mechanism capable of adjusting a pressure or a temperature. There is no particular limitation on the material. From the viewpoint of visibility, glass or the like is preferred at a normal pressure, and a material having high ozone resistance such as SUS is used under a pressure. The liquid phase reaction device may be provided with a mechanism which can continuously introduce and discharge the substance to be treated. The vapor-liquid reaction device 15 may not be substituted with an inert gas after charging the substance to be treated. However, since the content of oxygen in atmospheric air may be involved in an oxidation treatment, it is desired to be substituted with an inert gas. There is no particular limitation on the pressure of substitution with an inert gas as long as the pressure is an atmospheric pressure or more. However, when the pressure is higher than the pressure in the ozone mixed gas to be supplied, back flow of the mixed gas may arise, and thus it is necessary that the pressure is lower than that of the mixed gas to be supplied.

Specifically, similarly to the methods of first and second embodiments, the solution is formed inside the oxygen separation device 3 and then supplied to the deaeration device 13 in the present embodiment. To the solution supplied to the deaeration device 13, an inert gas is supplied on the way to form an ozone-containing inert gas having a reduced oxygen concentration. Next, this ozone-containing inert gas is supplied to the vapor phase reaction device 15 in which a substance to be treated has already been charged therein, and then an oxidation treatment is performed. The oxidation treatment time can be set until the values of ozone monitors 7, 8 become identical.

In the oxidation treatment method of the present embodiment, the solution formed by the oxidation treatment method of the first embodiment is treated in a liquid state, and the solution formed by the oxidation treatment method of the second embodiment is heated and treated in a vapor-liquid mixing state, while an ozone-containing inert gas obtained by deaeration of the formed solution using an inert gas is used in a formation treatment.

As described above, according to the oxidation treatment method of the present embodiment, the same effects as those of the first and second embodiments can be obtained. Furthermore, in the present embodiment, since the ozone-containing inert gas is supplied to the reaction device without accompanying with the fluorine-based solvent when compared with the first and second embodiments, no fluorine-based solvent adheres to the substance to be treated, and thus the drying step after treatment can be omitted.

The technical scope of the present invention is not limited to the aforementioned embodiments, and various modifications can be made without departing from the spirit and scope of the invention.

EXAMPLES

Specific examples will be described below.

Example 1

Using an oxidation treatment apparatus 41 shown in FIG. 1, an oxidation treatment was performed. Specifically, an oxygen-ozone mixed gas of 7 vol % of ozone and 93% of oxygen (0.06 PaG) generated in an ozonizer 1 was dissolved in, liquefied perfluorohexane ($C_6F_{14}$) at 20° C. to form a solution.

After placing a carbon fiber, this solution was supplied to a liquid phase reaction device 4 whose atmosphere was substituted with a nitrogen gas. As a result, 1 hour was needed until completion of the reaction.

After the completion of the reaction, the carbon fiber was taken out from the liquid phase reaction device 4 and then liquefied perfluorohexane was sufficiently dried.

After drying, water droplet was fallen on the carbon fiber. As a result, a non-treated article repelled water droplet, whereas, an ozone-treated article absorbed water droplet. The results revealed that hydrophilicity of the carbon fiber was improved.

Example 2

Using an oxidation treatment apparatus 42 shown in FIG. 2, an oxidation treatment was performed. Specifically, an oxygen-ozone mixed gas of 7 vol % of ozone and 93% of oxygen (0.06 PaG) generated in an ozonizer 1 was dissolved in liquefied perfluorohexane ($C_6F_{14}$) at 20° C. to form a solution.

This solution was heated to 60° C. by a heating device 9 to form a solution in a vapor-liquid mixed state.

After charging a carbon fiber, this solution was supplied to a liquid phase reaction device 11 whose atmosphere has been substituted with a nitrogen gas. As a result, 2 hours were needed until completion of the reaction.

After the completion of the reaction, the carbon fiber was taken out from the liquid phase reaction device 11 and then liquefied perfluorohexane was sufficiently dried.

After drying, water droplet was fallen on the carbon fiber. As a result, a non-treated article repelled water droplet, whereas, an ozone-treated article absorbed water droplet. The results revealed that hydrophilicity of the carbon fiber was improved.

Example 3

Using an oxidation treatment apparatus 43 shown in FIG. 3, an oxidation treatment was performed. Specifically, an oxygen-ozone mixed gas of 7 vol % of ozone and 93% of oxygen (0.06 PaG) generated in an ozonizer 1 was dissolved in liquefied perfluorododecane ($C_{12}F_{26}$) at 20° C. to form a solution.

Thereafter, this solution was supplied to a deaeration device 13 and a nitrogen gas was bubbled to form an ozone-containing nitrogen gas.

After placing a nickel powder in size of 0.1 µm, the ozone-containing nitrogen gas thus formed was supplied to a vapor phase reaction device 15 whose atmosphere has been substituted with a nitrogen gas at 20° C. under 0.03 MPa. As a result, 7 hour were needed until completion of the reaction.

After the completion of the reaction, an oxidation initiation temperature as an indicator of a sintering initiation temperature of the nickel powder was measured as it is by thermogravimetric analysis (TG). It was recognized that oxidation initiation temperature of a non-treated article was 200° C., whereas an oxidation initiation temperature of an ozone-treated article was raised, such as 280° C.

REFERENCE SIGNS LIST

1: Ozonizer
2: Dissolving device (Dissolving means)
3: Oxygen separation device (Undissolved gas removal means)
4: Liquid phase reaction device (Oxidation treatment means or Surface oxidation treatment means)
5: Pump
6: Ozone decomposition device
7, 8: Ozone monitor (Means that monitors ozone concentration)
9: Heating device (Temperature control means)
10: Cooling device
11: Vapor-liquid reaction device (Oxidation treatment means or Surface oxidation treatment means)
12: Vapor-liquid separation device
13: Deaeration device (Deaeration means)
14: Solvent recovery device
15: Vapor phase reaction device (Oxidation treatment means or Surface oxidation treatment means)
16: Inert gas supply device
17: Valve (Means that adjusts ozone concentration and supply amount)
41, 42, 43: oxidation treatment apparatus
L1: Circulating path

The invention claimed is:

1. A surface oxidation treatment method comprising the steps of:
  supplying an inert gas to an ozone-fluorine based solvent mixed solution having an ozone concentration of 120 to 500 mg/L and then deaerating the ozone-fluorine based solvent mixed solution to form an ozone-containing inert gas;
  removing by condensing the fluorine-based solvent from the ozone-containing inert gas; and
  bringing the ozone-containing inert gas, in which the fluorine-based solvent has been removed, into contact with a substance to be treated made of a combustible substance in a vapor phase, wherein
  a boiling point of the fluorine-based solvent is within a range from 178° C. to 200° C.

* * * * *